United States Patent [19]

Hume, III

[11] Patent Number: 4,714,727
[45] Date of Patent: Dec. 22, 1987

[54] AQUEOUS EMULSION COATING FOR INDIVIDUAL FIBERS OF A CELLULOSIC SHEET PROVIDING IMPROVED WET STRENGTH

[75] Inventor: Robert M. Hume, III, Cottage Grove, Minn.

[73] Assignee: H. B. Fuller Company, St. Paul, Minn.

[21] Appl. No.: 634,372

[22] Filed: Jul. 25, 1984

[51] Int. Cl.$^4$ .............................................. C08J 0/00
[52] U.S. Cl. .............................. 524/271; 252/311.5; 106/230; 106/231; 524/272; 524/274; 524/475; 524/478
[58] Field of Search ............... 524/475, 478, 271, 272, 524/274; 252/311.5; 106/230, 231

[56] References Cited

U.S. PATENT DOCUMENTS

| 347,200 | 8/1886 | Robinson et al. | 427/422 |
|---|---|---|---|
| 2,091,180 | 8/1937 | Magill | 91/70 |
| 2,127,650 | 5/1938 | Muller | 91/70 |
| 2,582,037 | 1/1952 | Hyde | 260/28.5 |
| 2,808,382 | 10/1957 | Takaitis | 524/478 |
| 3,105,823 | 10/1963 | Boenau | 260/28.5 |
| 3,200,005 | 8/1965 | Bauer | 524/475 |
| 3,321,428 | 5/1967 | Tordella | 260/28.5 |
| 3,522,081 | 7/1970 | Moyer | 117/119.2 |
| 3,682,733 | 8/1972 | Smit | 106/214 |
| 4,117,199 | 9/1978 | Gotoh et al. | 428/486 |
| 4,468,254 | 8/1984 | Yokoyama et al. | 524/478 |

FOREIGN PATENT DOCUMENTS

| 0605495 | 9/1960 | Canada | 524/274 |
|---|---|---|---|
| 0965833 | 8/1964 | United Kingdom | 524/475 |
| 1082153 | 9/1967 | United Kingdom | 524/475 |

OTHER PUBLICATIONS

Blackley, "Emulsion Polymerization", pp. 405-406.

*Primary Examiner*—Joseph L. Schofer
*Assistant Examiner*—J. M. Reddick
*Attorney, Agent, or Firm*—Merchant, Gould, Smith, Edell, Welter & Schmidt

[57] ABSTRACT

A basic aqueous emulsion composition that can be used as a treatment for cellulosic sheets or articles made of cellulosic fibers to provide improved water resistance by forming a discrete coating on the individual fibers that make up the sheet while not substantially limiting the compatibility of the treated sheet with aqueous glues, dyes or inks comprising a major proportion of water, a mixture of wax and rosin, an emulsion stabilizer and a chelating agent.

15 Claims, No Drawings

AQUEOUS EMULSION COATING FOR INDIVIDUAL FIBERS OF A CELLULOSIC SHEET PROVIDING IMPROVED WET STRENGTH

FIELD OF THE INVENTION

The invention relates to an aqueous emulsion coating agent which can be used to provide water resistance to cellulosic sheets or composites. More particularly the invention relates to an aqueous emulsion composition which can interact with cellulosic fibers in a sheet in order to provide each individual fiber or fiber bundle with substantial water resistance while not sealing the cellulosic sheet with a continuous film of hydrophobic material that can substantially limit the compatibility of the treated surface with aqueous glues, dyes or printing inks.

BACKGROUND OF THE INVENTION

Cellulosic fiber products such as paper, paper board, corrugated paper board, hard board, fiber board, gypsum board, chip board, particle board and others have been used for many years in a variety of end uses including the formation of packaging materials and as structural components. The cellulosic fiber products have the advantages of being inexpensive and readily available. However, in certain environments where standing water, aqueous mists, aqueous sprays, or high humidity can be present, the tendency of cellulosic material to readily absorb water can pose a principal disadvantage since wet cellulose can lose strength.

The water absorbed into the cellulosic materials can cause weakness by weakening the cellulosic sheet and by weakening glues that hold the materials together. Many cellulosic fiber products are made by suspending finely divided cellulose particles in aqueous suspensions and forming sheets of the cellulosic materials. This production method can leave the sheets susceptible to the harmful effects of water. Further, the sheets are often combined into structural units using aqueous glues or adhesives in order to insure the cellulosic sheets are solidly bonded. Water, when absorbed by the cellulosic fibers, can be transported to the glue line and can reduce the adhesive bonding strength.

In the past it has been most common to coat or impregnate cellulosic fiber products with hydrophobic materials such as waxes or synthetic resins to impart a degree of water or grease resistance and to improve structural integrity. Waxes, polyolefin resins and mixtures thereof, for example, have been used in the production of films or foils for lamination over substrates such as particle board, which are then used as packaging or structural units. Starches and modified starches have also been used for many years for sizing paper products and for improving water resistant properties of cellulosic fiber products. More particularly, U.S. Pat. No. 347,200 discloses coating cellulosic sheets with a hot melt of paraffin wax and natural resins. McGill, U.S. Pat. No. 2,091,180 teaches the use of a paraffin wax-dihydronaphthalene resin coating for paper products. Miller, U.S. Pat. No. 2,127,650 teaches a melt coating of hexamethylenetetraamine in combination with paraffin, an aluminum salt such as aluminum formate, and gelatin. Hyde, U.S. Pat. No. 2,582,037 teaches forming a coating on paper products having a microcrystalline wax, polyethylene and paraffin wax. Boenau, U.S. Pat. No. 3,105,823 teaches a hot melt coating of polyethylene and wax for paper products. Fordella, U.S. Pat. No. 3,321,428 teaches the use of a hot melt coating including wax and an ethylene unconjugated diolefin copolymer. Moyer, U.S. Pat. No. 3,522,081 teaches a wax coating for paper fibrous products including paraffin wax, an ethylene vinyl acetate polymer, a resin and polyethylene. Gotoh, U.S. Pat. No. 4,117,199 teaches a coating for paper comprising an aqueous emulsion of a rubber latex and a wax emulsion.

The waterproofing materials discussed above are most commonly applied to the cellulosic fiber sheets in the form of continuous films or in another continuous form resulting in water repellancy. Continuous films tend to form a coating which can completely seal the individual cellulosic fibers in the sheet from the environment. Since the sheet is separated from the environment by a substantial film of material, aqueous glues, aqueous dyes, and aqueous inks can be substantially prevented from penetrating such a film and contacting the fibers. The barrier can in this way prevent the successful gluing, coloring, or printing of the coated sheets since the individual fibers cannot interact with the glue, dye or ink.

Aqueous glues, dyes and inks are commonly applied directly to the surface of a cellullosic sheet and act by associating directly with the cellulosic fibers. Most aqueous glues, dyes and inks comprise aqueous solutions or suspensions of at least partially hydrophilic compounds which associate with the hydrophilic cellulosic fibers in order to bond sheet to sheet or to bond dyes or inks to the fibers. In the absence of direct association between these compositions and the cellulosic fiber, successful gluing, dyeing and printing cannot always be obtained.

Further, many waterproofing processes use a melt of wax, rosin, or modified starch which are applied in large amounts to the surface of cellulosic sheets at relatively high temperature. These processes are commonly energy intensive and require substantial amounts of material in order to provide any substantial water resistance.

Accordingly, a substantial need exists for low cost waterproofing composition that can be applied to cellulosic sheets at near ambient temperature which provides water resistance to the sheets and does not prevent the interaction of the cellulosic fibers with aqueous glues, dyes, and printing inks.

BRIEF DISCUSSION OF THE INVENTION

We have found an aqueous emulsion composition that can be used to treat cellulosic sheet material to provide substantial water resistance while not limiting the compatibility of the cellulosic sheet with aqueous glues, inks, and dyes. The aqueous composition that we have found when contacted with the cellulosic sheet material releases emulsified waterproofing materials that intimately associate with individual cellulosic fibers, and coat the fiber with water resistance providing components. Since the aqueous emulsion does not form a continuous coating which seals the surface of the cellulosic sheet from the environment, aqueous glues, inks and dyes can interact with the individual coated fibers providing glue, ink or dye compatibility.

The novel aqueous waterproofing emulsion compositions can comprise a major proportion of water, an effective waterproofing amount of a combination of a wax and a rosin compound, an effective amount of a chelating agent and a specific emulsion stabilizing surfactant formed by reacting a relatively strongly basic component and a relatively weak acidic component.

While we do not wish to be held to a theory of action, we believe that as the basic aqueous emulsion is applied to the surface of a cellulosic sheet, which commonly contains polyvalent ionic species in the sheet surface, the ionic species interacts with and neutralizes the emulsifier composition, causing the emulsion to separate into a hydrophobic (water-hating) component and water. The separated hydrophobic wax-rosin component of the treating composition contacts and adheres to the surface of each individual cellulosic fiber in the sheet. The treated sheet can then be heated to remove water in the emulsion preparation. The chelating agent promotes emulsion and formation and protects the emulsion from the harmful effects of service water. Further, the chelating agent can prevent premature reaction with trivalent species, such as aluminum ions, which could cause a precipitation of the wax prior to its intimate contact and dispersion into the fiber matrix.

DETAILED DISCUSSION OF THE INVENTION

Briefly, the compositions of this invention which provide water resistance to cellulosic sheets while preserving the compatibility of the sheets with aqueous glues, inks and dyes comprise, in a basic emulsion composition, a major proportion of water, an effective water resistance providing amount of a combination of wax and rosin, a basic emulsion stabilizer comprising the neutralization reaction product of a relatively strong basic component and a relatively weak acidic component and a sufficient amount of a chelating agent to stabilize the emulsion from the effects of hardness components in service water. The composition of this invention can also contain a polyethylene wax or other film-former component which can harden the waterproofing components, other emulsion stabilizers, antifoam agents, preservatives, and organic and inorganic bases.

WAX

The term wax is used very broadly and is applied to a wide variety of materials. The materials can have properties resembling certain well known natural or synthetic waxes or can be used to provide properties similar to those associated with well known wax, such as sealing, polishing, candle making, etc. Many waxy substances have been found in nature and have been known to be useful for many years. Historically waxes include substances that are natural products. Chemically, certain natural waxes are esters of fatty acids and fatty alcohols, or are long chain hydrocarbons derived from petroleum sources. Physically waxes are water repellant solids having a useful degree of plastic character. However modern waxes include various synthetic substances that can replace natural wax in many preparations. The composition of natural waxes generally comprise an ester of saturated fatty acid and long chain monohydric alcohol.

Paraffin wax is obtained from waxy petroleum distillates which are chilled and mixed with suitable solvents to precipitate wax. Wax is removed by filtration from solvent mix, and solvent is then removed from the wax. Microcrystalline wax is obtained from solvent extraction of the distillation residuum of crude petroleum. The residuum is often first deasphalted and after chilling microcrystalline wax precipitates and is removed by filtration. Particularly preferred waxes for use in the aqueous emulsions of the invention are petroleum waxes such as microcrystalline waxes, slack waxes, and paraffin waxes.

The waterproofing nature of the basic emulsion of the invention can be improved using an effective amount of a film-forming polymeric agent such as a polyethylene, a polyacrylate, a polystyrene, a polyvinylchloride, etc. The film former is an easily emulsifiable polymer having a molecular weight from about 1,500 to about 50,000, preferably in the range of 2,500 to 10,000, and a ring and ball softening point of about 75° to 150° C. The preferred polyethylene film-forming wax agent cooperates with the other components to form a strong waterproofing barrier in intimate contact with the individual cellulosic fibers in the sheet. In the absence of the film-forming agent the waterproof barrier in some instances can have reduced strength.

ROSIN COMPOUNDS

Rosins useful in the invention may be derived from well known natural products and are generally thermoplastic resinous room temperature solids. Naturally occurring resinous materials typically comprise complex ethylenically unsaturated mixtures of relatively high molecular weight organic acids and related neutral materials which can be polymerized to form polymerized rosin.

Wood rosins or other modified forms of such naturally occurring rosins, for example hydrogenated or esterified wood rosins (or rosin polymers) are particularly useful. Polymeric rosin can be made from natural monomers such as terpene, pinene, etc. or synthetic monomers, such as styrene, and others in combination with the natural products.

The preferred form of the rosin compounds comprises rosin compositions that are compatible in an aqueous emulsion including an emulsifier or other finely divided solids. Preferred rosin compounds include hydrogenated or partly hydrogenated wood rosin which can be esterified, and polymerized rosin and polymerized rosin esters prepared from polyhydroxy alcohols such as ethylene glycol, propylene glycol, glycerine, 1,4-butanediol, etc., such as Dressanol 215 or Dressanol 155. The article "Rosin and Rosin Derivatives", pages 475–508, Vol. 17, *Encyclopedia of Chemical Technology*, which is a general discussion of the production, derivation, modification and use of rosin and rosin derivatives, is hereby incorporated by reference herein.

EMULSION STABILIZER

The aqueous emulsions that provide waterproofing properties to cellulosic sheets is maintained in emulsion form using a basic stabilizer that is the reaction product of a relatively strong basic component with a relatively weak organic acidic component. The emulsion stabilizer can be prepared prior to emulsion formation or can be made in situ during emulsion formation.

Both organic and inorganic bases can be used in the emulsion stabilizer. Preferred bases for use in preparing the emulsion stabilizer of the invention are ammonia and the amines. Typical organic amines include compounds having from 1 to 5 amino groups and from about 1 to 4 organic groups. The groups can be straight chain or branched chain alkyl, aryl or alkyl substituted aryl groups. Examples of suitable amines include methylamine, ethylamine, aniline, isopropylamine, tertiary butyl amine, diethylamine, dicyclohexylamine, monoethanolamine, diethanolamine, triethanolamine, pyridine, etc. and mixtures thereof.

Preferred basic components comprise ammonia, monoethanolamine, diethanolamine, triethanolamine, and mixtures thereof.

The relatively weakly acidic component of the emulsion stabilizer comprises an organic anion forming compound having 1 or more anion forming functional groups. The compounds can have a molecular weight of about 150 to 100,000. Examples of useful relatively weakly acidic components include carboxylic acids, substituted succinic acids, modified fatty acids, relatively high molecular weight polymeric compounds having pendant or substituent acidic groups such as polyacrylic acid, polymethacrylic acid, acrylic copolymers, methacrylic copolymers, maleic anhydride polymers and copolymers, and others. Preferred relatively acidic components for use in the emulsion stabilizer of the invention include polyelectrolyte polymers and the $C_{6-18}$ fatty acids including caproic acid, lauric acid, palmitic acid, stearic acid, behenic acid, oleic acid, linoleic acid, linolenic acid, etc. Most preferred weakly acidic components comprise the mono, di- and tri-unsaturated carboxylic acids having 8 to 24 carbon atoms, including oleic, linoleic and linolenic acid, and mixtures thereof.

Chelating Agent

The emulsions of the invention commonly contain a chelating agent that performs at least two functions. First, the chelating agent stabilizes the emulsion in the presence of substantial amounts of hardness components in service water from which the emulsions are prepared. Secondly the chelating agent can prevent premature emulsion separation during the contacting of a cellulosic material with the emulsion of the invention. Service water commonly contains ions of calcium, magnesium, etc. ($Ca^{+2}$, $Mg^{+2}$), in varying amounts that can interfere in the formation and stability of an emulsion. Chelating agents can form a coordinate-covalent bond with the hardness components of service water, thereby sequestering hardness components and rendering the water more compatible with emulsion preparation and stability. Further, as the emulsion is contacted with a cellulosic substrate, mono-, di- or trivalent metal ions present on the surface of the cellulosic substrate can interact with the chelating agent and the emulsion stabilizer causing the emulsion to break resulting in the separation of the finely divided hydrophobic solids from the emulsion medium. The chelating agent slows such separation to permit the penetration of the emulsion into the cellulosic sheet prior to the separation of the water resistance components. The wax, rosin and optional film forming agents, once the emulsion is broken, become associated with the surface of cellulosic fibers, resuting in increased water resistance.

Chelating agents are commonly organic polyfunctional compounds that can form coordinate-covalent bonds with polyvalent metal cations. While purely inorganic chelating agents are well known, the most useful agents include a broad variety of synthetic organic compounds having a variety of functional donor groups in a variety of arrangements. Chelating agents are classified in accordance with a number of coordinating groups present and the number of chelating rings which are formed during the chelating reaction. Thus a chelating agent may be bidentate, terdentate (tridentate), quadradentate (tetradentate), quinquidentate (pentadentate), etc., depending on its having 2, 3, 4, 5, etc. coordinating groups. The most common and most widely used chelating agents are those that coordinate metal ions through oxygen or nitrogen donor atoms or a combination of the two. Examples of common chelating agents include nitriloacetic acid (NTA), N-hydroxyethylaminodiacetic acid, citric acid, tartaric acid, gluconic acid, tripolyphosphate, and other polyphosphate glasses, 2,2'-bipyridine, 8-hydroxyquinoline, N,N'-ethylene-bis[2-(ortho-hydroxyphenyl)]glycene, carboxymethlymercapto succinic acid, polyamino carboxylates, ethylenediaminetetraacetic acid and salts thereof, hydroxyethyl-ethylene diamine triacetic acid and salts thereof, etc. Preferred chelating agents for use in the invention, for reasons of low cost, emulsion stability and rapid emulsion formation and breakdown, when desired, are ethylenediamine tetraacetic acid, its mono, di, tri and tetra sodium salt or mixtures thereof.

The emulsion can also contain a protective colloid which can aid in stabilizing the emulsion. Protective colloids include aqueous emulsifiable polymeric components such as polyvinyl alcohol and hydroxyethyl cellulose.

The strength of the coating on the individual cellulosic fibers can be improved by incorporating into the emulsion composition of the invention an emulsifiable polymer component which can be SBS rubber, a styrene-maleic anhydride copolymer, a methylmethacrylate-vinyl acetate copolymer, etc.

The emulsion can contain a variety of other components which can provide additional useful properties to the emulsion. Additives such as preservatives, antibacterial agents, antifoam agents, etc.

Emulsion Preparation

The emulsion of the invention can be made by combining the components in a manner appropriate for the formation of aqueous emulsions. Commonly the more hydrophobic components are converted into a finely divided form and combined with water in the presence of the chelating agent and stabilizer under conditions of high mixing rates.

A preferred method for forming the preferred embodiments of the invention is as follows. The wax, rosin, and film-forming agent are combined in a finely divided or melt form and are mixed until uniform.

If the mixture of finely divided solids is in a dry or aqueous form, the mixture can be combined directly with the emulsion stabilizing composition which can be added to the mixture, dissolved or suspended in water. Alternatively, into the mixture of components can be placed the basic or acidic components of the emulsion stabilizer and the emulsion stabilizer can be formed in situ in the mixture by then adding the other components to the mixture. The basic component and the acidic component then interact in the mixture in order to form the emulsion stabilizing composition.

If the components are combined in melt form at temperatures of about 100° F. (about 70° C.) or greater, the emulsion stabilizing components can be added directly to the melt, commonly in the substantial absence of water. Either the basic or the acidic component can be added directly to the melt or the acidic and basic components can be added together.

The melt is then cooled to a temperature compatible with the addition of water which when added can immediately form a stable emulsion. Commonly the water is added to the melt at a temperature of 200° F. (95° C.)

or less. Commonly water having a temperature near the temperature of the melt is added in order to promote rapid mixing and emulsion formation. At this time additional components such as an antifoam agent, a protective colloid, a dye, a preservative, can be added. After the emulsion is formed and uniform, the chelating agent can commonly be added. The fully formed emulsion composition commonly has a low Brookfield viscosity of about 50–1000 cP using a number 1 spindle at 20 rpm measured at ambient or room temperature, about 65°–80° F. (20°–25° C.). The emulsion commonly has about 0.1 to 10% solids, a pH of greater than about 8, and a density of greater than about 8 lbs. per gallon.

The basic emulsion coating composition of the invention comprises an emulsion containing a major proportion of water, 0.5–10 wt-% of a chelating agent, about 0.01 to about 5 wt-% of a wax compound, about 0.01 to about 10 wt-% of a rosin compound, optionally about 0.01 to about 5 wt-% of an additional foam forming polymer such as a polyethylene or a styrene acrylate copolymer, about 0.01 to about 5 wt-% of an emulsion stabilizer, and typical amounts of antifoam agents, preservatives, dyes and other components. Preferably, the emulsion stabilizer, for reasons of economy and ease of preparation, contains a major proportion of water, about 0.5 to about 5% of a 5% aqueous solution of the chelating agent, about 0.01 to about 2 wt-% wax, about 0.01 to about 2 wt-% rosin, about 0.01 to about 1 wt-% of the optional film-forming agent, about 0.01 to about 2 wt-% of the emulsion stabilizer, about 0.001 to about 0.1 wt-% of an antifoam, and about 0.001 to about 1 wt-% of 37 wt-% aqueous formaldehyde preservative. Most preferably, the emulsion coating of the invention can contain about 0.1 to about 1.5 wt-% of a paraffin wax having a melting point of about 150° to 200° F., about 0.01 to about 0.5 wt-% of a hydrogenated wood rosin compound, about 0.1 to about 1.0 wt-% of a polyethylene or styrene acrylic acid copolymer film-forming agent, about 0.1 to about 0.5 wt-% of an emulsion stabilizer comprising the reaction product of a trialkanol amine and a long chain fatty acid, about 0.01 to about 0.1 wt-% of antifoam, and about 0.005 to about 0.05 wt-% of 37 wt-% aqueous formaldehyde preservative.

The compositions of the invention can be used to provide water repellancy to any cellulosic sheet material. The composition can be added to the sheet prior to or after the sheet is formed. Preferably, the celulosic sheets are coated with a small amount of the compositions of the invention after the sheets are formed. A coating of the composition on the sheet that provides about 25 to 50 grams of the wet coating per square meter (0.1 to 6 lbs. per 100 ft.$^2$) of the sheet, preferably 50 to 1500 grams (0.2 to 6 lbs.), most preferably 125 to 1250 grams per square meter (0.5 to 5 lbs. per 100 ft.$^2$), is commonly used. The composition can be added to the sheet by any well known method that can control the addition of the composition including roller coating, spraying, dipping, coating with a doctor blade, etc.

After the composition is added to the sheet the composition is cured to both dry the sheet and to cause the wax, rosin, and other components to bind securely to the individual fiber bundles. Cellulosic sheets that can be treated for water repellancy include corrugated paperboard and its component parts, plywood, particle board, paper, kraft paper, etc.

The foregoing invention will be further understood by relation to the following Examples which contain a best mode.

EXAMPLE 1

Into a 2,000 milliliter beaker equipped with mechanical stirring was placed 50 grams of the wax emulsion of Example IV. Stirring was initiated and to the wax emulsion was added the basic complexing agent product of Example VII. Mixing was continued until the chelating agent and the wax emulsion were completely homogeneous, and into the homogeneous mixture was added 710.5 grams of water and 2.0 grams of formaldehyde. Stirring was continued until the composition was blended.

EXAMPLE II

Example I was repeated except that 50 grams of the wax emulsion of Example V was used.

EXAMPLE III

Example I was repeated except 50 grams of the wax emulsion of Example VI was used.

EXAMPLE IV

Into a suitable industrial preparatory vessel was placed 27.2 parts of the wax emulsion of Example VIII. Mixing was initiated and into the well mixed wax emulsion was added 72.4 parts of a 38 wt-% aqueous solution of a carboxylated acrylic polymer (molecular weight of about $2 \times 10^5$). Into the mixing equipment was placed 0.2 parts of an antifoam (Dow Corning FG-10) and 0.28 parts of a 37 wt-% aqueous formaldehyde solution. The components were mixed until uniform and the product had a pH of about 8, was about 37 wt-% solids, had a viscosity of about 200 cP measured with a No. 2 Brookfield spindle at 20 rpm at 85°.

EXAMPLE V

Into a suitable industrial preparatory vessel is placed 15 parts of paraffin wax having a melting point of about 150° F. The wax is melted and heated to a temperature of about 240° F. Into the molten wax is placed about 19 parts of a styrene butyl acrylate copolymer comprising 57 wt-% styrene, 41.5 butyl acrylate, and about 1.5% acrylic acid. After the addition of the copolymer the mixture was heated and agitated until uniform. Into the melt is placed 5 parts of oleic acid. The melt was stirred until uniform and cooled to 200° F. Into the melt was added in 5 equal portions 60 parts of water having a temperature of 150° F. After the addition of water was complete, about 0.68 parts of potassium hydroxide was added. Into the mixture was added a small amount of a cellulosic stabilizer, about 0.2 parts of a defoaming agent (Dow Corning PG 10) antifoam, and 0.2 parts of 37 wt-% aqueous formaldehyde.

EXAMPLE VI

Into a suitable industrial preparatory vessel was placed 19 parts of paraffin wax having a melting point of 150° F. (equal parts of Indrawax 3032 and Mobilewax 130). The wax was heated and melted at a temperature of 240° F. Into the molten wax was placed 6 parts of a polyethylene film-forming agent (Epolene E-15, Eastman Industries) and the mixture was reheated to 240° F. Into the melt was placed 2 parts of a hydrogenated wood rosin (Stabilite resin—Hercules) and the mixture was reheated until it attained a temperature of 240° F.

Into the equilibrated homogeneous mixture was added 4.0 parts of oleic acid (Emery 213), along with 3.0 parts of 99 wt-% triethanolamine. Immediately after the triethanolamine addition, 65.3 parts of 200° F. hot water containing 0.5 parts of an antifoam (Dow Corning FG-10) was immediately added to the melt with vigorous agitation. After the mixture became homogeneous, the mixture was cooled to 170° F. and 0.5 parts of gaseous ammonia was added and the mixture was homogenized to insure that the phases were intimately and completely combined with the emulsified particles of oil at sufficiently small size to maintain an emulsion in water. After homogenizing is complete about 0.05 parts of an antifoam (Dow Corning FG-10) and 0.15 parts of 37 wt-% aqueous formaldehyde were added. The mixture was cooled to 100° F., filtered and stored. The product had a viscosity of about 100 cP using a No. 1 Brookfield spindle at 20 rpm at 85° F. It contained about 33 wt-% solids and had a pH of about 8.75.

EXAMPLE VII

Into a 500 milliliter glass breaker equipped with a magnetic stirrer and bar was placed 200 grams of water. Into the water with stirring was added 30.0 grams of disodium ethylene diamine tetraacetic acid, and 7.5 grams of 28 wt-% aqueous ammonia. The mixture was stirred until the components had dissolved and had become uniform.

EXAMPLE VIII

Into a suitable industrial preparatory vessel was placed 19 parts of paraffin wax having a melting point of 150° F. The wax was melted and heated to a temperature of 240° F. Into the molten wax was placed 9 parts of a polyethylene film-forming agent (EPOLENE E-15, Eastman Industries) and the mixture was heated to 240° F. Into the melt was placed 2 parts of a hydrogenated wood rosin (STABILITE resin—Hercules) and the mixture was heated until it attained a temperature of 240° F. The mixture was stirred for 30 minutes, and into the melt was placed 2.5 parts of oleic acid (PAMOLYN 125—Hercules), along with 2.5 parts of triethanolamine. The melt was stirred until uniform and then cooled to 200° F. About 15 parts of water at a temperature of about 150° F. was added to the melt in about 5 equal portions. During the addition of water the melt was thoroughly and strongly mixed in order to form the emulsion. After the addition of water was completed the emulsion was stirred for 15 minutes at 200° F. and about 0.2 parts of a defoaming agent (Dow Corning PG-10) was added along with 5 parts of a 55 wt-% polyvinyl acetate protective colloid emulsion. After thorough mixing, an additional 40 parts of water were added and the mixture was cooled to 120° F. Finally, 0.2 parts of 37 wt-% aqueous formaldehyde was added.

In a separate industrial blending vessel equipped with a jacket heater was blended 20 parts of water, 3 parts of a 5% aqueous solution of disodium ethylene diamine tetraacetic acid (VERSENE NA) and 0.75 parts of gaseous ammonia. The mixture was stirred and heated to a temperature of 164° F. (76° C.) Into the resulting uniform solution was added 5 parts of the emulsion prepared above. After agitation, an additional 71 parts of water was added along with 0.2 parts of 37 wt-% aqueous formaldehyde.

The finished emulsion had a Brookfield viscosity of 7.5 cP using a Brookfield viscometer with a number 1 spindle at 20 revolutions per minute at room temperature. The emulsion contained 2.1 wt-% solids at a pH of 9.9 and a density of 8.39 lbs. per gallon.

The above Examples were tested for their ability to provide cellulosic corrugated board with water repellency using the Tappi RC-212 test for water repellancy of paper using a sliding drop. In the RC-212 test, an $8\frac{1}{2} \times 11$ treated sheet of paper is fixed at an angle of 45° with horizontal. A drop of water is placed at the top of the sheet and allowed to roll down the sheet along the incline. The trail of water left by the rolling drop is observed and the repellancy of the paper service as a result of the composition is reported as shown in Table 1.

TABLE 1

| Result | Repellancy |
| --- | --- |
| Continuous trail - even width | 0 |
| Continuous trail - slightly narrower than drop | 1 |
| Continuous trail - occasionally broken; definitely narrower than drop | 2 |
| Half of trail wetted | 3 |
| One-fourth of trail wet with elongated droplets | 3.5 |
| Leaves spherical droplets scattered over one-fourth of trail | 4 |
| Occasional scattered spherical droplets | 4.5 |
| Rolls off perfectly with no trail | 5 |

Conduct the test by sliding the paper along, testing at several points.

The products of Examples I, II, III and VIII were coated on corrugated board using a wire wrapped glass rod and dried. The coating provided the corrugated board with about 50 grams of wet coating per m$^2$composition. The coated corrugated board was tested for water repellancy as shown in Table 2.

TABLE 2

TAPPI RC-212 (Sliding Drop) Water Repellancy Test of Corrugated Paper Coated with the Products of the Examples Using a Glass Rod Dried One Minute at 300° F.

| Drop # | Ex. I | Ex. II | Ex. III | Ex. VIII | Uncoated (Control) |
| --- | --- | --- | --- | --- | --- |
| 1 | 5 | 5 | 5 | 5 | 0 |
| 2 | 5 | 5 | 5 | 5 | 0 |
| 3 | 5 | 5 | 5 | 5 | 0 |
| 4 | 5 | — | 5 | 5 | 0 |
| 5 | 4.5 | — | 5 | 5 | 0 |
| 6 | 5 | — | 5 | 5 | 0 |

Table 2 shows that the corrugated board coated with the products of the Examples obtain substantial repellancy from a small amount of the coating composition. The uncoated paper (control) had essentially 0 repellancy while the coated corrugated board had a repellancy of 5, except for one drop that showed a water repellancy of 4.5, an exceptionally high value.

Clearly, the data shows that water repellancy compositions can be prepared from different waxes, different film-forming agents, and different sources of the emulsifying stabilizers and can provide high quality water repellancy.

The above discussion, Examples and data illustrate the invention. However since many embodiments and variations can be made without departing from the spirit and scope of the invention, the invention resides wholly in claims hereinafter appended.

I claim:

1. A basic emulsion composition, that can provide water resistance to a cellulosic sheet while preserving its affinity with aqueous compositions, which comprises in an emulsion:
   (a) a major proportion of water;
   (b) an effective water resistance providing amount comprising about 0.02 to 15 wt-% based upon the total emulsion composition of a mixture of a wax compound and a rosin compound;
   (c) an effective amount comprising about 0.01 to 5 wt-% based upon the total emulsion composition of an emulsion stabilizer comprising the reaction product of a relatively strong basic component and a relatively weak acidic component; and
   (d) an effective amount comprising about 0.01 to 10 wt-% of the total emulsion composition of a chelating agent resulting in the chelation of ionic species in the water and in the cellulosic sheet.

2. The emulsion composition of claim 1 wherein the wax compound is a paraffin wax.

3. The emulsion composition of claim 1 wherein the rosin compound comprises a hydrogenated or partially hydrogenated wood rosin.

4. The emulsion composition of claim 1 wherein the emulsion has a pH greater than 8 and the relatively strong basic component of the emulsion stabilizer is ammonia, monoethanolamine, diethanolamine, triethanolamine, or mixtures thereof.

5. The emulsion composition of claim 1 wherein the relatively weak acidic component of the emulsion stabilizer comprises a $C_{8-24}$ fatty acid, an addition polymer having pendent carboxylic acid groups, or mixtures thereof.

6. The emulsion composition of claim 1 wherein the chelating agent is ethylenediamine tetraacetic acid or a salt thereof.

7. The emulsion composition of claim 1 wherein the basic emulsion additionally comprises a protective colloid.

8. The emulsion composition of claim 7 wherein the protective colloid is polyvinyl alcohol.

9. The emulsion composition of claim 1 which additionally comprises an antifoam agent, a preservative, a dye, or mixtures thereof.

10. The emulsion composition of claim 4 having a pH of about 8 to 10.

11. The emulsion composition of claim 1 having a density of 8 pounds per gallon or greater.

12. The emulsion composition of claim 1 wherein the emulsion contains about 0.01 to 10 wt-% solids.

13. The emulsion composition of claim 1 wherein the emulsion also contains an effective strength enhancing amount of an addition polymer selected from the group consisting of styrene-butadiene-styrene copolymers, acrylamide polymers, methylmethacrylate polymers, and mixtures thereof.

14. The emulsion composition of claim 1 wherein the wax compound is a petroleum wax compound, and the chelating agent is selected from the group consisting of ethylenediamine tetracetic acid, its salts, citric acid, its salts, and mixtures thereof.

15. The composition of claim 1 wherein the wax compound is a petroleum wax compound, the emulsion stabilizer comprises the reaction product of i) ammonia, monethanolamine, diethanolamine, triethanolamine, or mixtures thereof, and (ii) a $C_{8-24}$ fatty acid, an addition polymer having pendent carboxylic acid groups, or mixtures thereof, and the chelating agent comprises citric acid, a salt of citric acid, ethylenediacetic acid, a salt of ethylenediacetic acid, or mixtures thereof.

* * * * *